(12) United States Patent
Winkler (10) Patent No.: US 8,694,154 B2
(45) Date of Patent: Apr. 8, 2014

(54) STORAGE AND ORDER-PICKING SYSTEM AS WELL AS METHOD FOR AUTOMATICALLY ADDRESSING OF STORAGE SPACES

(71) Applicant: SSI Schaefer Peem GmbH, Graz (AT)

(72) Inventor: Max Winkler, Graz (AT)

(73) Assignee: SSI Schäfer Peem GmbH, Graz (AT)

( * ) Notice: Subject to any disclaimer, the term of this patent is extended or adjusted under 35 U.S.C. 154(b) by 0 days.

(21) Appl. No.: 13/871,354

(22) Filed: Apr. 26, 2013

(65) Prior Publication Data

US 2013/0338819 A1  Dec. 19, 2013

Related U.S. Application Data

(63) Continuation of application No. PCT/EP2011/067290, filed on Oct. 4, 2011.

(30) Foreign Application Priority Data

Oct. 26, 2010  (DE) .......................... 10 2010 050 461

(51) Int. Cl.
*G06F 7/00* (2006.01)

(52) U.S. Cl.
USPC ........... 700/216; 700/213; 700/226; 700/222; 700/228; 700/229

(58) Field of Classification Search
None
See application file for complete search history.

(56) References Cited

U.S. PATENT DOCUMENTS

| | | | |
|---|---|---|---|
| 6,762,681 B1 * | 7/2004 | Danelski | 340/568.1 |
| 2007/0050080 A1 * | 3/2007 | Peck | 700/214 |
| 2009/0115613 A1 * | 5/2009 | Piazza et al. | 340/572.8 |

FOREIGN PATENT DOCUMENTS

| AT | 007 005 U1 | 7/2004 |
|---|---|---|
| DE | 101 28 177 A1 | 12/2002 |

* cited by examiner

*Primary Examiner* — Yolanda Cumbess
(74) *Attorney, Agent, or Firm* — Renner, Otto, Boisselle & Sklar, LLP (57) ABSTRACT

A storage and order-picking system and method, wherein communication addresses are assigned to storage spaces, the system comprising a warehouse having a plurality of storage spaces each being either free or having assigned one good; a plurality of display devices each allocated to an assigned storage space and including a measuring device; a control device configured to allow addressing of order-picking data to each display device, wherein a display device can be activated based on transmitted order picking data such that an order-picking person visually recognizes from which one of the storage spaces goods are to be removed, and wherein a storage-space location is recorded for each storage space; a network connecting the display devices to the control device; and a location-measuring system configured to determine a mounting location for each mounted display device and to compare the so-determined mounting location with the recorded storage-space location.

15 Claims, 4 Drawing Sheets

STORAGE AND ORDER-PICKING SYSTEM AS WELL AS METHOD FOR AUTOMATICALLY ADDRESSING OF STORAGE SPACES

RELATED APPLICATIONS

This is a continuation application of the co-pending international patent application WO 2012/055679 A1 (PCT/EP2011/067290) filed on Oct. 4, 2011, and claiming priority of the German patent application DE 10 201 0 050 461.0 filed on Oct. 26, 2010, which are fully incorporated by reference herewith.

BACKGROUND OF THE INVENTION

The present invention relates to a storage and order-picking system as well as to a method for automatically addressing storage spaces, wherein order-picking data are transmitted via a communication bus. Picking ("Pick-by-Light") and/or storing ("Put-to-Light") is performed in a manual light-guided manner in the storage and order-picking system.

RELATED PRIOR ART

Classic manual order-picking is done in accordance with the principle "man-to-goods". In this case, an order-picking person moves in a (decentralized) working area for the purpose of picking, wherein provision units (such as storage containers, cartons, pallets) are stored at fixed spaces in the warehouse in terms of access spaces. In accordance with a picking order, articles which are determined by a customer, are collated by collecting them. An order, or a picking order, is to be understood, for example, as a customer's order, which is formed by one or more order positions (order lines), respectively, including a quantity (removal quantity) of an article.

The light-guided order-picking method "Pick-by-Light" offers significant advantages compared to classic manual order-picking methods (source: Wikipedia) where order-picking lists are processed without further assistance for finding removal locations. In these cases, the order-picking person searches his/her way through the warehouse. However, with Pick-by-Light systems a signal light including an (optional) digital read-out or also an alphanumerical display including at least one confirmation key (optionally) as well as an optional input and/or correction key (see also U.S. Pat. No. 6,762,681 B1) is provided at each access space (storage space). Alternatively, also only one single digital read-out element can be provided centrally, wherein in this case each of the access spaces is provided with at least one signal light (cf. DE 20 2008 006 941 U1). A signal light is activated at the access space, where the articles, or piece goods, are to be removed, wherein the to-be-removed number occurs on the digital read-out. Removal can be confirmed by means of a confirmation key, and stock change can be fed back in real-time to a warehouse management system.

Order processing is typically performed in a computer-aided manner by means of an order-processing system which is integrated into an order-picking control. The order-picking control can comprise a resource planning system. Additionally, the order-picking control can further have integrated a (storage) space management as well as an information display control. The order-picking control is typically realized by means of a data processing system, which preferably operates in an online modus for transmitting data and processing data without delay.

Many order-picking systems have a modular structure, wherein each module (e.g., storage space display, order container display, conveyor segments, serving devices, etc.) can be controlled by means of a separate controller. Therefore, the order-picking control requires, amongst other things, location information for each of the modules, in order to allow controlling the modules correctly (e.g., sequence). This particularly applies with regard to conveyor segments. Installation and commissioning of a conventional conveyor system typically is a work-intense process. The layout and the installation of conventional conveyor systems often represent solutions, which are tailor-made for the respective customer. Programming of the control is part of these customer-specific solutions. The controlling software, as well as the conveyor system, is customer-specific tailor-made. The individual segments of the conveyor system are typically addressed via a communication bus. Initial addressing of the participants (e.g., a conveyor segment) frequently happens manually when a technician walks through the system and physically assigns a communication address to each of the participants during the commissioning.

Also, automatic solutions exist for the purpose of assigning addresses. In this case, the participants are chained via specific lines to each other ("daisy chain"), so that a superordinated control can automatically assign addresses by communicating with the individual participants one after the other and assigning continuous addresses.

With the Pick-by-Light system of U.S. Pat. No. 6,762,681 B1, each of the storage spaces, or access spaces, as mentioned above, comprises a display device arranged at the location of the access space. The display devices are mounted on a bus rail including an integrated bus line for supplying data and energy to the display devices. Each of the display devices has a unique serial number, which is assigned by the manufacturer, allowing a controller to communicate data to the display devices. In this case, the display devices display an access space and a removal quantity. If the order-picking person has removed the corresponding number of storage goods from the access space, or the storage space, he/she can signal the processing via a confirmation key to the control. However, since each of the display devices has to be chained to its direct neighbor and each of the storage spaces has to be equipped with one display device, a lot of work emerges in the context of connecting the display devices by wires. The additional daisychain lines for chaining the display devices to each other are required in addition to the data line. The wiring of the display devices is work-intense. The many wires required for connecting the individual display devices are expensive.

The document US 2009/0115613 A1 discloses an RFID-based positioning system.

SUMMARY OF THE INVENTION

Therefore, it is an object of the present invention to provide a storage and order-picking system which involves as less as possible work effort and as less as possible wiring when installing the display devices and subsequently allocating the display devices to the respective storage spaces. The addressing (allocation of communication address to storage space) is to to be conducted automatically, without requiring the technician to walk through the warehouse for manually noting and assigning the addresses. The warehouse worker should be allowed to select the (geometrical) size of the storage space, preferably freely.

According to a first aspect of the invention a storage and order-picking system is proposed, wherein communication addresses are assigned automatically to storage spaces, the system being configured for manual light-guided order processing and comprising at least one warehouse having a plurality of storage spaces, wherein each of the plurality of storage spaces is either free or has assigned one storage good; a plurality of display devices, wherein each of the display devices is allocated to at least one assigned storage space, wherein each of the display devices is mounted to one of the allocated and assigned storage spaces, and wherein each of the plurality of display devices comprises a measuring device for generating a measured value and comprises a unique communication address; a control device which is data-connected to the allocated display devices and which is configured to allow addressing of order-picking data to each of the allocated display devices, wherein an addressed allocated display device can be activated based on transmitted order-picking data such that an order-picking person visually recognizes from which one of the assigned storage spaces storage goods are to be removed, and wherein the control device comprises a memory device, where respectively one storage-space location is recorded in terms of coordinates for each storage space of the plurality of storage spaces; a network, which data-connects the allocated display devices to the control device; and a location-measuring system which is configured to determine, based on a measured value, a mounting location for each mounted display device and to compare the so-determined mounting location with the recorded storage-space location, wherein each of the mounting locations is uniquely allocatable to one of the recorded storage-space locations, in order to allocate one of the recorded storage-space locations, which matches to the so-determined mounting location, and one of the unique communication addresses to the so-determined mounting location.

According to a second aspect of the invention it is proposed a storage and order-picking system configured for automatically assigning communication addresses to storage spaces and further configured for manual light-guided order-processing by an order-picking person, comprising: at least one warehouse having a plurality of storage spaces, wherein each of the storage spaces is either a free storage space or an assigned storage space to which a storage good is assigned; a plurality of display devices, wherein the display devices are allocated at least to the assigned storage spaces thereby defining allocated and assigned storage spaces as well as allocated display devices, wherein each of the allocated display devices is mounted to the corresponding one of the allocated and assigned storage spaces, and wherein each of the display devices comprises one measuring device, which is adapted for generating a measured value, has a unique communication address; a control device which is data-connected to the allocated display devices and which is configured to transmit order-picking data to each of the allocated display devices, wherein each of the allocated display devices is adapted to be activated, based on transmitted order-picking data, such that the order-picking person visually recognizes from which ones of the allocated and assigned storage spaces storage goods are to be removed, and wherein the control device comprises a memory device where a storage-space location is respectively recorded, in terms of coordinates, for each of the storage spaces; a network, which data-connects the allocated display devices to the control device; and a location-measuring system which is configured to determine, based on the measured values, a mounting location for each mounted display device, and to compare the so-determined mounting location with the recorded storage-space locations, wherein each of the mounting locations is uniquely allocatable to one of the recorded storage-space locations, in order to allocate one of the recorded storage-space locations, which matches to the so-determined mounting location, and one of the unique communication addresses to the so-determined mounting location.

The invention also allows automatic allocating a communication address to a storage space. Technician does not need to walk through the warehouse anymore for allocating manually the communication addresses of the display devices to storage spaces (location), where the corresponding display device is mounted or attached to. This is not to be confused with an automatic addressing method where each of the display devices can be automatically assigned to a unique universal communication address. In accordance with the invention it is automatically recognized where one of the display devices is (geographically) located within the reference system of the warehouse, or at which of the storage spaces the display device has been mounted to. This is done by means of the location-measuring system. The location-measuring system provides a value which uniquely corresponds to a spatial coordinate, or a spatial region, within the reference system of the warehouse. Then, the final allocation of the respective communication address to the storage space is performed by comparing the so-determined mounting location of the display devices to already recorded storage-place locations. Preferably, the storage-place locations and the mounting locations are provided in a spatial coordinate system of the warehouse, wherein the storage devices (racks, etc.) in turn are preferably arranged along a predefined grid.

If the storage-space locations and the mounting locations of the display devices are present in the same reference system, the comparison of the locations, which have been measured for the display devices, to the fixedly recorded storage-space locations is facilitated. The allocation happens faster.

With a particular embodiment the location-measuring system comprises a measuring device and at least one electrical line, to which preferably a fixed default voltage is applied to, wherein the at least one electrical line is provided at each of the plurality of storage spaces such that each of the allocated display devices can be connected to the at least one electrical line, wherein the corresponding display device is mounted on the storage space allocated thereto so that an individualizing ohmic resistance value can be measured dependent on distance.

The location determination thus happens, for example, by means of a resistance determination. The higher the resistance is, the further the storage space can be located remotely to a point of reference.

Alternatively or supplementary, the location-measuring system comprises a measuring device (e.g., optical reading head) and at least one optical readable continuous distance measure (e.g., digital code ruler) having several tracks, which is provided at each of the plurality of storage spaces such that each of the allocated display devices is arranged oppositely to the distance measure so that the measuring device can read the respective mounting location (code) by means of the distance measure.

In this case, for example, coding can be used similar to, for example, rotational sensors, in order to allow unitary determination of an exact location of a reading head relative to a measuring scale (code ruler) at any time.

Further, the location-measuring system can comprise, alternatively or supplementary, a GPS-like locating system, which is capable of determining each of the mounting locations in the "warehouse" reference system.

For example, each of the display devices can comprise a receiving unit for receiving signals from transmitters, which are arranged, for example, on a facility ceiling in a distributed manner. The position of the receiving unit can be determined by triangulation from the respective signals received from several transmitters by the receiving unit.

Further, it is advantageous, if the location-measuring system comprises a device for detecting a run time of a signal transmission between one of the allocated display devices and the control device, or another point of reference, wherein an individualizing signal run time is recorded in the memory device for each of the storage-space locations.

Additionally, it is advantageous if the measuring device comprises a plurality of measuring sensors, wherein each of the plurality of display devices has respectively integrated one of the plurality of measuring sensors.

Further, according to a third aspect of the invention a method for automatically configuring a storage and order-picking system is proposed, which is configured for manual light-guided order processing and comprises a warehouse including a plurality of storage spaces, which can be defined freely, wherein one display device is mounted to each defined storage space, the display device having a unique communication address, and wherein for each defined storage space one storage-space location is recorded in a memory device in terms of coordinates, the method comprising the steps of defining storage spaces, determining one storage-space location for each defined storage space and recording each determined storage-space location in the memory device; automatically determining one mounting location for each mounted display device by means of a location-measuring system, based on measured values generated by the mounted display devices; transmitting a unique communication address between each mounted display device and the control device via a network, which data-connects the mounted display devices to a control device; and comparing each one of the mounting locations to the recorded storage-space locations for allocating one of the unique communication addresses to each of the defined storage spaces.

According to a fourth aspect of the invention in a storage and order-picking system, which is configured for manual light-guided order-processing by an order-picking person and which comprises a warehouse including a plurality of storage spaces, a plurality of display devices, a control device having a memory device, a network, and a location-measuring device, wherein the storage spaces are definable freely, wherein respectively one display device is mounted to each of the so-defined storage spaces, each of the display devices has a unique communication address and being capable of generating a measured value, and wherein for each of the so-defined storage spaces one storage-space location is recorded in the memory device in terms of coordinates, a method for automatically assigning communication addresses to the storage spaces is proposed, the method comprising the steps of: defining the storage spaces; determining one storage-space location for each of the so-defined storage spaces and recording each of the so-determined storage-space locations in the memory device; mounting the display devices to the so-defined storage spaces; automatically determining one mounting location for each of the mounted display devices by means of the location-measuring system based on the measured values generated by the mounted display devices; respectively transmitting a unique communication address between each of the mounted display device and the control device via the network, which data-connects the mounted display devices to the control device; and comparing the mounting locations to the recorded storage-space locations for respectively allocating one of the unique communication addresses to each of the defined storage spaces.

Thus, a warehouse worker can mount display devices on arbitrary storage spaces for initially configuring an order-picking guidance system. Also, the warehouse worker can provide selected storage spaces only with one of the display devices. The warehouse worker can alternatively provide all of the storage spaces with respectively one display device. The warehouse worker can transfer and displace display devices arbitrarily, which have already been mounted. Further, it is possible to newly define the geometrical size of the storage spaces. A number of unit storage spaces can be combined, in terms of control, to form a user-defined storage space. Bigger user-defined storage spaces can be divided into smaller storage spaces.

The order-picking (guidance) system configures itself in a self-supporting manner during all these processes. Each of the storage spaces, which has been allocated to one of the display devices, due to a mounting process by the warehouse worker, is automatically assigned one unique communication address. The unique communication address can be a MAC address, the serial number of the display device, or the like. The unique communication address can also be assigned to the display device, in terms of a known automatic addressing method, by means of a superordinated control, or can be given thereto. The location-measuring system allows determination of a value for each mounted display device, which corresponds to a mounting location of the corresponding display device. This value can be, for example, an ohmic resistance, a voltage, an amperage, a single run time, a coordinate, a distance, or the like. If the value is not present in terms of a (spatial) coordinate, in which the storage locations of the storage spaces are recorded in the memory device within the display devices and/or within the control, the value is correspondingly converted. In this case comparison tables, conversion functions, or the like are applied to the value for expressing the coordinate of a respective one of the display devices in the reference system of the storage spaces. Of course, the coordinates of the storage spaces can also be converted into the reference system of the display devices.

Typically, the coordinates of the storage spaces are known in advance. The determination of the coordinates of the storage spaces can be conducted in a computer-added manner. The coordinates can be presented absolutely or relatively. Relative coordinates can express, for example, a sequence of the display devices.

The order-picking system can further be provided with a graphical user interface, which is adapted for inputting the specific arrangement of the storage devices by the warehouse worker, such as a relative arrangement of racks, namely preferably in the reference system of the warehouse. The position, or the arrangement, of the racks can be indicated graphically to the warehouse worker on a screen. All these measures increase the ease of use, and ensure that no errors occur during configuration of the warehouse and the order-picking guidance system.

Preferably, each defined storage space is a unit storage space, or comprises a group of directly adjacent unit storage spaces, as described above.

With a preferred embodiment display devices are only mounted to such storage spaces, which are actually assigned to storage goods, or will to be assigned.

In this manner it is possible to visually identify free (unoccupied and nonassigned) storage spaces in an easy manner. Storage spaces, which have no storage goods assigned, then do not comprise one of the display devices. If the warehouse worker needs to configure new storage spaces in the order-picking guidance system, he/she recognizes such storage spaces, which are still available, because no display devices are attached to these storage spaces.

In principle, the installation of the display devices is very easy because the warehouse worker, or the technician, does not need to pay attention which one of the display devices is mounted to which one of the storage spaces. During the installation and commissioning no serial numbers or the like need to be noted and need to be matched to a layout of the warehouse representing at least the relative position of the storage spaces. The warehouse worker, or the technician, selects one of the display devices from a plurality of (identical) display devices, which can only be distinguished, for example, by their specific serial number, and mounts same to a desired one of the storage spaces. The remaining configuration is done by the invention. A communication connection to the control via the network is established due to the mounting of the display device. At the same time, the mounting location is specified, which can be determined by the location-measuring system at least in an equivalent manner. The storage locations are already recorded so that the assignment of a unique communication address can be conducted automatically.

Preferably, definition of storage spaces happens in a storage-good-optimized manner.

This means that, for example, long storage goods such as bars or pipes can be assigned to a number of unit-storage spaces arranged side by side, so that the corresponding storage good geometrically fits exactly into the so-defined storage space.

BRIEF DESCRIPTION OF THE DRAWINGS

It is clear that the above-mentioned and hereinafter still to be explained features cannot only be used in the respectively given combination but also in other combinations or alone, without departing from the scope of the present invention.

Embodiments of the invention are illustrated in the drawings and will be explained in more detail below, wherein.

PREFERRED EMBODIMENTS OF THE INVENTION

In the following description of the invention same parts and features will be designated by the same reference numerals, wherein the disclosure contained throughout the entire description can be roughly transferred to same parts and features having identical reference numerals. Positional information such as "above", "below", "lateral", "left", "right", etc. are related directly to the described figure and are to be transferred roughly to the new position in case of a positional change.

Figure 1:
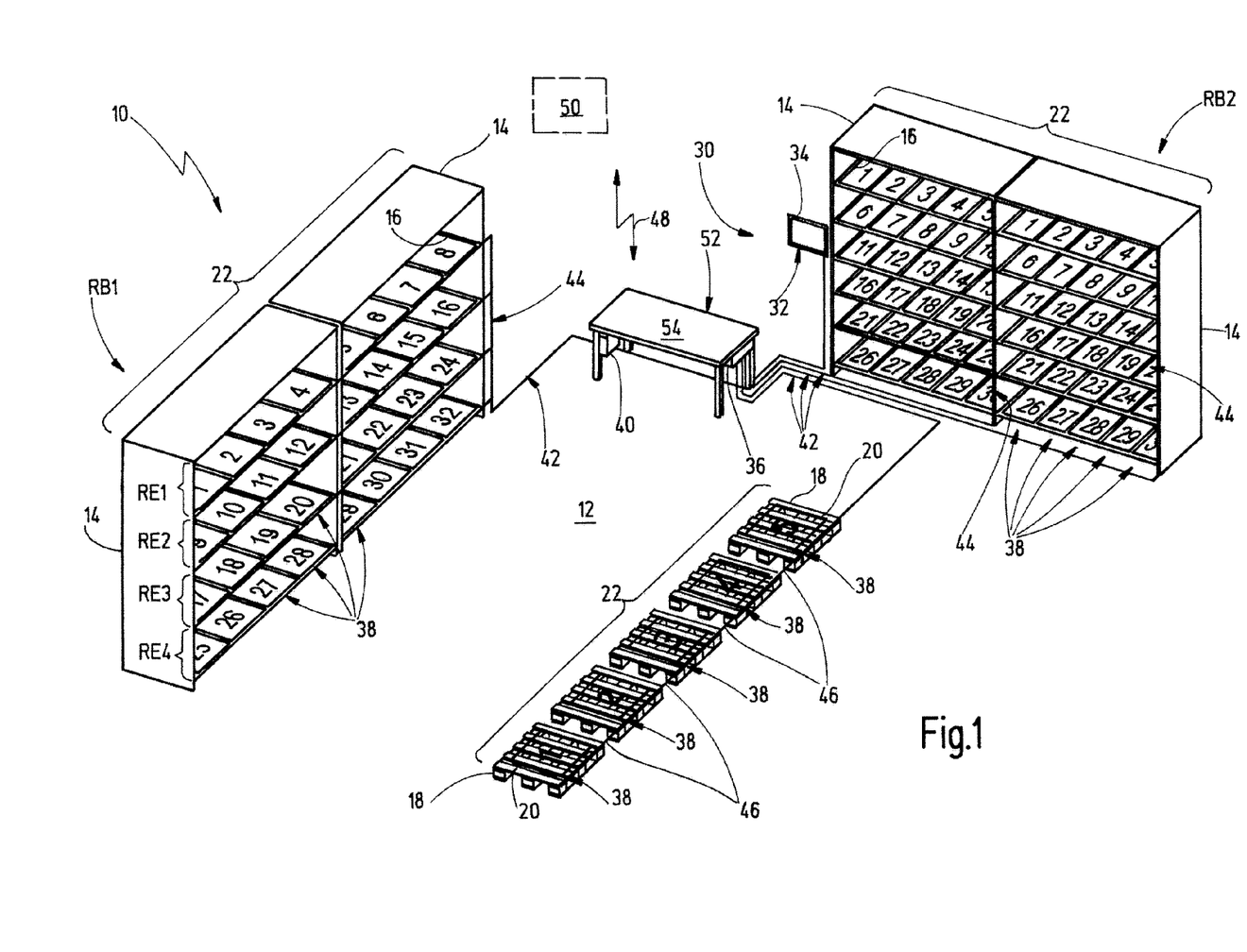
FIG. 1 shows a storage and order-picking system in accordance with the present invention having an order-picking guidance system.

FIG. 1 shows a perspective view of a storage and order-picking system 10, which is equipped with an (order-picking) guidance system 30, which can be configured by a user. Both the storage and order-picking system 10 and the guidance system 30 are described in detail in the German patent application DE 10 2009 042 144 A1, which was filed on Sep. 14, 2009. With regard to a fundamental structure and a fundamental configuration of a corresponding system, it is referred to DE 10 2009 042 144 which is entirely enclosed herewith by reference. The guidance system 30 comprises such (software) components of the invention which are required for automatically determining addresses. In particular, these are algorithms which can assign communication addresses to storage spaces, and which can generate and visualize picking orders.

The storage and order-picking system 10 can comprise a conventional warehouse 12, which comprises storage devices, in the present case exemplarily racks 14 having rack-storage spaces 16, as well as pallet-storage spaces 20, wherein the pallet-storage spaces 20 serve as provision spaces, or access spaces, for pallets 18, and the rack-storage paces serve as provision spaces, or access spaces for other storage goods. The rack storage spaces 16 can serve as provision spaces, or access spaces, for containers, cartons, trays, etc. loaded with piece goods, but also for piece goods without load supports (load carriers). In general, the rack-storage spaces 16 and pallets-storage spaces 20 represent storage spaces 22.

A first rack block RB1 is shown at the left in FIG. 1, which exemplarily comprises two wider racks 14. The racks 14 of the rack block RB1 comprise, for example, four rack planes RE1-RE4. Each of the rack planes RE1-RE4 exemplarily comprises eight storage spaces 22, which in the present case are continuously numbered by the FIGS. 1 to 32 from the upper left to the lower right.

A second rack block RB2 is arranged at the right upper part of FIG. 1, which comprises two smaller racks 14. The smaller racks 14 of the rack block RB2 are subdivided, in the present case into six rack planes RE each of which comprises, for example, five storage spaces 22, which are numbered in the present case by the FIGS. 1 to 35 for each of the smaller racks 14.

Between the two rack blocks RB1 and RB2 five (Europool) pallets, which represent pallet-storage spaces 20 numbered by the FIGS. 1 to 5, are shown on a facility ground.

It is clear that the warehouse 12 can comprise other storage devices (e.g., high bay racks, etc.). The racks 14 are exemplarily represented by shelving racks, which can receive storage goods also without load carriers. Alternatively, also racks can be used into which, for example, storage containers are inserted into lateral support rails on their circulating rims, the lateral support rails in turn being mounted to rack posts (ASPW, automatic small parts warehouse). The specific embodiment of the warehouse 12 is presently not limited. As already described in DE 10 2009 042 144, each already existing warehouse 12 can be retrofitted by the guidance system 30 which is configurable by a user. The guidance system 30 comprises a host computer 32, which preferably includes a display 34. The host computer 30 further comprises at least one controller 36, which is arranged, in the present case, separately to the host computer 32. It is clear that the controller 36 can also be integrated into the computer 32.

Further, a database 40 (e.g., a host) is shown in FIG. 1, which can be provided to the users of the warehouse 12. Alternatively, the host 40 can also be part of the host computer 30.

The controller 36 is typically connected to the storage spaces 22 via controller lines 42 (communication bus). Each of the storage spaces 22 can have allocated one separate storage space display 38 (hereinafter also designated "display device 38"). The display devices 38 can be installed later, for example, by screwing them onto the racks 40 into correspondingly provided profile tracks (bus tracks), in which the communication bus 42 extends.

The controller lines 42 can be connected to distribution lines 44, which in turn deliver signals from the controller 36 in the area of the racks 14 to the different rack planes RE. At the rack planes RE the display devices 38 are just connected to the communication bus by putting them on. Connection lines 46 can be used between different storage devices (e.g., racks, pallets, etc.), as exemplarily shown between the two racks 14 of the first rack block RB1. The connection lines 46 can also be provided between the pallets 18 of the pallet-storage spaces 20.

Alternatively, the communication between the controller 36, the host computer 32, and the plurality of display devices 38 can also happen wirelessly, as indicated by means of a double arrow 48.

The host 40 can be connected optionally to a superordinated warehouse management computer 50, or can directly be implemented thereby. Typically, the warehouse management computer 50 is already present in a user's warehouse 12. The warehouse management computer 50 is part of an order-picking control, as will be described hereinafter in more detail with reference to FIG. 2.

Further, the warehouse 12 can comprise a work station 52. A table 54, where a warehouse worker can deposit and collect storage goods (piece goods, articles, products, etc.), i.e. pick, if he/she retrieves the storage goods from the storage spaces 22 for processing a picking order, can be arranged at the work station 52. During storage of storage goods the to-be-stored storage goods can first be put on the table 54 before being distributed to selected ones of the storage spaces 22, which are visually indicated to the warehouse worker by the host computer 32.

It is clear that the distribution lines 44 and connection lines 46 are not required if one single communication bus is used, as will be explained hereinafter in more detail with reference to FIG. 3.

The work station 52 is operated by the warehouse worker (order-picking person) in accordance with the order-picking principle "man-to-goods". The warehouse worker can walk up and down along the storage spaces 22. The order-picking process is conducted in a light-guided manner ("Pick-by-Light", PbL). The storage paces 22 can either be free or occupied by having assigned, in terms of data, respectively one specific type of storage goods. It is clear that several different storage spaces 22, which are located remotely to each other, can have assigned one and the same type of storage goods. If the warehouse worker processes one picking order, such display devices 38 of the storage spaces 22 from which storage goods are to be removed, are lid subsequently or simultaneously. A respectively removal quantity can either be fade-in by the respective display device 38, or displayed on the central screen 34. As soon as the warehouse worker has removed the required number of storage goods from the visualized storage space 22, he/she signals this process to the control by actuating, for example, a confirmation key of the display device 38. Then, the visualization goes out so that the warehouse worker can work through the warehouse 12 order line by order line, in order to collect all storage goods which are predetermined by the picking order.

It is clear that not each of the storage spaces 22 needs to be occupied at any time. The storage spaces 22 do not need to have all the same size either, with regard to their dimensions. Unit-storage spaces are shown in FIG. 1, i.e. all of the storage spaces 22 within one storage device have the same dimensions. However, several unit-storage spaces, in terms of data, can be also combined to form one single storage space 22. In this way, for example, the first four storage spaces 22 of the first storage plane RE 1 in the left rack 14 of the rack block RB1 can be combined to form one single storage space 22. A storage space 22, which has been combined in this manner, can then be used, for example, for storing long goods (e.g., bars, etc.). It is clear that arbitrarily many unit-storage spaces 22 can be combined to form one storage space 22, as long as the unit-storage spaces 22 are arranged directly adjacent to each other. In order to facilitate the description below, hereinafter the storage spaces 22 represent unit-storage spaces only.

Figure 2:
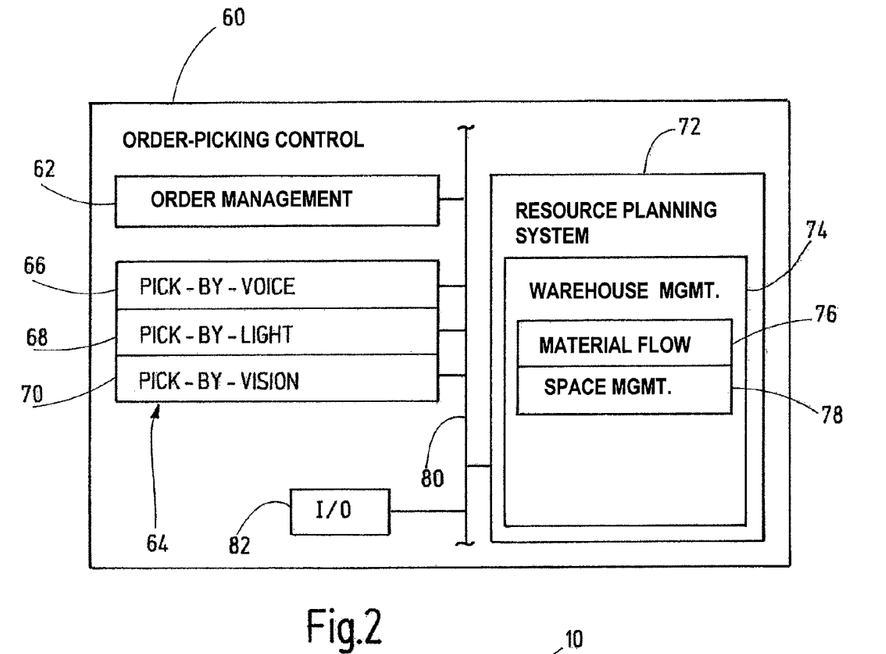
FIG. 2 shows a block diagram of an order-picking control.

As already described in DE 10 2009 042 144, one of the strengths of the guidance system 30 is to be seen in that the storage spaces 38 can be configured by warehouse workers in a simple manner. An image of the actual warehouse 12 is displayed to the warehouse worker by means of software, for example, on the central screen 34. All of the storage spaces 38 are free in the original state, i.e. they are not occupied. If the guidance system 30 is retrofitted, the storage spaces 38 have not yet been provided with display devices 38. The warehouse worker, or a technician, who takes the guidance system 30 in operation, mounts respectively one display device 38 preferably to each of the storage spaces 22 by connecting the display device 38 to a communication bus 56 (cf. also FIG. 3). It is preferred to use one single communication bus 56, which couples each of the storage spaces 22, in terms of data, to a (superordinated) control device (for example, the controller 36, the host computer 32, the warehouse management computer 50, or similar computers). FIG. 2 shows a block diagram of an order-picking control 60.

The order-picking control 60 of FIG. 2 can have a modular structure and comprises the following: an order management 62, order-picking guidance strategies 64 (such as Pick-by-Voice 66, Pick-by-Light 68, Pick-by-Vision 70, or similar), a resource planning system 72, which in turn comprises a warehouse management 50' (in terms of the warehouse management computer 50 mentioned before), which is in turn can control material flow 76 as well as space management 78, and/or an interface management 82. The modules 60 to 82 are largely implemented in terms of software and/or hardware. The different modules can communicate with each other via one (or more) communication bus(es) 80. The order-picking control 60 can be a part of a central computer (not shown). In the following, the order-picking guidance strategy 68 ("Pick-by-Light") is used in particular.

The order management 62 is responsible for distributing incoming picking orders to work stations 52 for the purpose of processing, the work stations 52 being exemplarily realized like the one in FIG. 1. In this context, factors like capacity utilization, range of piece goods, path optimization, and the like are important. Entire orders, but also only partial orders, can be assigned to one of the work stations 52 for being processed. Typically, one picking zone is assigned to the work station 52, as exemplarily represented in FIG. 1 by means of the four racks 14 and the five pallet-storage spaces 20. It is clear that within the warehouse 12 a number of such work stations 52 can be defined.

The present invention is substantially used in two configuration scenarios, namely during the commissioning of a warehouse 12 by a technician, who mounts respectively one display device 38 to each storage space 12 and connects same to the above-mentioned communication bus 56, and on the other hand during (re)configuration of the storage spaces 22 by a warehouse worker, who starts, or changes, a (storage) space management. Both scenarios provide a problem in that a superordinated control such as the host computer 32 needs to be informed on the fact which of the display devices 38 has been mounted to which of the storage spaces 22. This information is important for enabling the order-picking control 60 to guide the warehouse worker to the right location within the warehouse 12 for the purpose of picking or storing.

Figure 3:
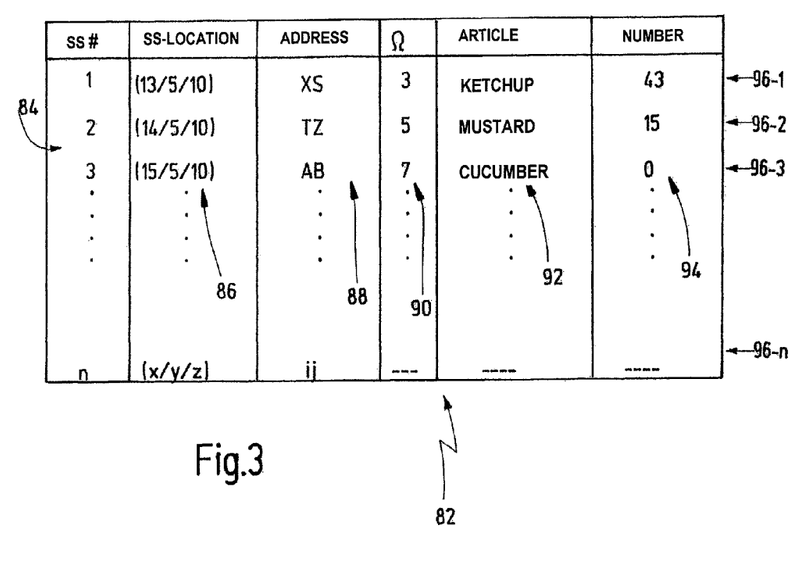
FIG. 3 shows a table including values for determining storage spaces, as well as a resource planning system.

For fulfilling this task, the order-picking controller 60 requires information, some of which are exemplarily shown in table 82 of FIG. 3.

With reference to FIG. 3 the table 82 will be explained below from left to right with reference to columns. Each line represents a data record. The first column represents storage-space numbers 84. The second column represents storage-space locations, wherein the warehouse 12 preferably serves as reference system of (spatial) coordinates allowing to express the storage-space locations 86, preferably in an absolute manner. Unique (communication) addresses 88 of display devices 38 are represented in the third column. In this context, for example, serial numbers, MAC addresses, automatically allocated communication addresses, or the like can be used allowing unambiguous addressing of the display devices 38, in order to communicate with a superordinated control. (Location) coordinates of the respective display device 38 are recorded in the fourth column. This can happen in terms of spatial coordinates of the warehouse 12, which already serve as the reference system of the storage spaces 22 (column 1), or in terms of an equivalent quantity. In the example of FIG. 3 this happens in terms of resistance values, as will be explained hereinafter in more detail with reference to FIG. 4. The fifth column represents a type of articles or a type of storage goods 92. The sixth column can indicate a respective number 94 of the associated type of article 92. Each line of the table 82 represents one uniform data record 96. It is clear that additional columns can be added including additional information such as article characteristics, class of hazardous freight, or the like.

The first four columns are particularly relevant to the present invention, since based on this information one unique communication address 88 can be automatically assigned to each of the storage spaces 22. The first four columns are used by the space management 78 (cf. FIG. 2). The first five columns can be used by the warehouse management 74. All six columns of the table 82 can be of interest to the resource planning system 72.

Figure 4:
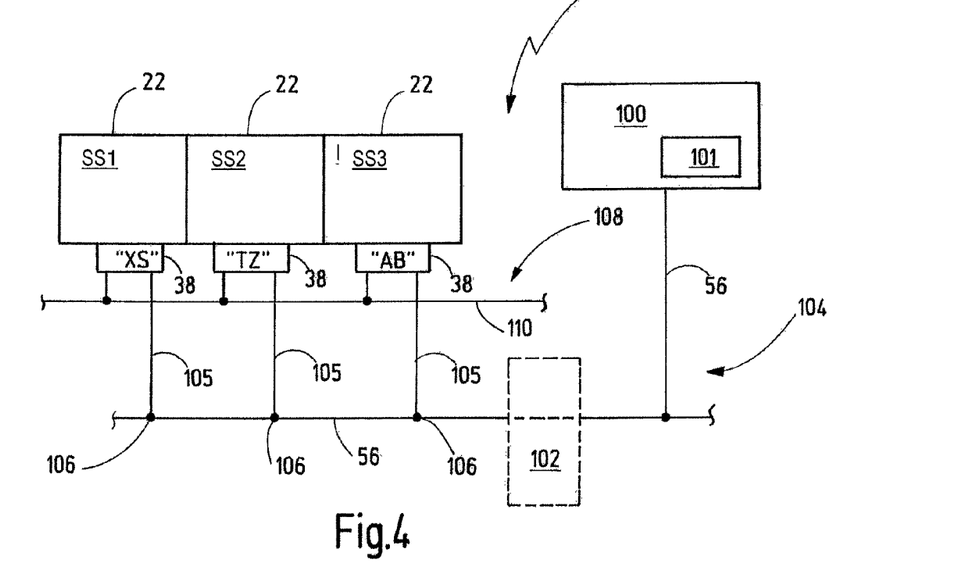
FIG. 4 shows a section of a storage and order-picking system in accordance with the invention.

With reference to FIG. 4 a section of a storage and order-picking system 10 in accordance with the present invention is shown. The system 10 of FIG. 4 comprises a superordinated control 100 (e.g., the order-picking control 60 including the warehouse management computer 50), and can optionally comprise subordinated control devices 102 (e.g., the controller 36 and/or the host computer 32). The guidance system 30 can be integrated into the warehouse management computer 50. Further, the system 10 comprises a network 104 which in turn has one or more communication buses 56 connecting each of the display devices 38, which is mounted to one of the storage spaces 22 for the sake of (storage good) assignment, at least to the superordinated control 100. In FIG. 4, for example, only three (unit) storage spaces 22 (SS1 to SS2) are shown. At each of the storage places 22 respectively one display device 38 is mounted, which in turn is connected to the communication bus 56. The display devices 38 represent knots 106 of the network 104. In the simplest case, the display device 38 is clipped on a (not shown) bus strip, thereby simultaneously establishing the data connection to the communication bus 56.

The system 10 further comprises a location-measuring system 108 for the display devices 38. An electrical line 110 is exemplarily shown in FIG. 1, belonging to the location-measuring system 108. The line 110 can be integrated into the (not shown) bus line as an additional line. The line 110 presently acts as a linear ohmic contact. Each of the display devices 38 is connected to the line 110 so that each of the display devices 38 can measure an ohmic value corresponding to a respective distance relative to an end of the line 110. Each of the rack planes RE can be provided with a separate line 110. A different voltage can be applied to each of these lines thereby allowing distinguishing between the different lines.

The location-measuring system 108 is formed by a combination of hardware and software. The hardware components comprise the measuring devices 116 of the display devices 38. The measuring devices 116 generate the measured values 90, which are reported to the control device 100, or 102, for being further processed. The software component, which can be part of the control device 100 or 102 determines, based on the measured values 90, corresponding coordinates for the mounting locations of the display devices 38, and compares the so-determined mounting loctaions to the recorded storage-space locations, in order to respectively determine a corresponding one of the recorded storage-space locations matching to the mounting location. Then, the unique communication address of the corresponding display device 38 is allocated to the so-determined storage-space (location).

Each of the display devices 38 comprises a unique and universal address 88 (comparable to a MAC address in the field of TCP/IP). The address 88 can be allocated automatically by the control 100 or 102. The actual communication is conducted via this address 88. The sequence information for the logical task of order picking (or each other task requiring a sequence or logical position determination within the warehouse 12) is obtained, for example, from a resistance measurement. In this manner, the three display devices 38 of FIG. 3 can have, for example, the universal addresses XS, AB, and TZ. As resistance values 90 could be measured 3 Ohm for XS, 8 Ohm for AB, and 5 Ohm for TZ. In this way, the logical and orderly sequence is determined, namely at first XS, then TZ, and then AB. In this context, the resistance values 90 again correspond to (spatial) coordinates in the reference system of the warehouse 12 so that an automatic allocation of the addresses 88 to the respective storage spaces 22 can be conducted based on known spatial coordinates of the storage spaces 22.

The location-measuring system 108 should be configured such that the measured value, which is reported back by the display device 38 to the superordinated control 100 or the subordinated control 102, is unique, wherein the measured value is equivalent to a spatial coordinate, or a region within space.

With the example of the electric line 110 of FIG. 4, this condition can be met by connecting each of the storage spaces 22, for example, via one single line 110 in a sequence to each other. Alternatively, the line 110 can have multiple parts, wherein each partial line, which in this case is respectively allocated to a fixedly defined group of storage spaces 22, or which passes these storage spaces 22, is supplied with a unique voltage value or current value.

As an alternative to the ohmic embodiment of the location-measuring system 110, as shown in FIG. 4, for example, an optical location-measuring system 108, or a locating-added location-measuring system 108, can be used.

In case of an optical location-measuring system 108, the electrical line 110 is replaced by a strip, which is provided with a scale, wherein the scale can be implemented, for example, by a (digital) code ruler.

In case of a locating-added location-measuring system, each of the display devices 38 can be equipped with, for example, a GPS-similar receiver receiving the signals from transmitters, which are fixed in a distributed manner, for example, to a ceiling of the warehouse 12.

The display devices 38 are connected to the network 104 through network connections 105. The network 104 can be an Ethernet-based network. The network connections 105 connect together a number of display devices 38 of different storage locations 22. The network connections 105 further connect the display devices 38 to the superordinated control 100 and/or the subordinated controls 102, wherein in FIG. 4 merely one single superordinated control 102 is shown, which can be implemented, for example, by the controller 36 of FIG. 1. Each of the racks 14 of FIG. 1 could be connected, for example, to such a subordinated control 102. Subordinated controls 102 always make sense if storage devices can be combined to form storage areas. The controls 100 and 102 can address data respectively globally or individually to a specific one of the display devices 38. An example of a global addressing process will be given below.

The network connections 105 can be normal or fast Ethernet connections. It goes without saying that other network types can be used beside the Ethernet standard.

Figure 5:
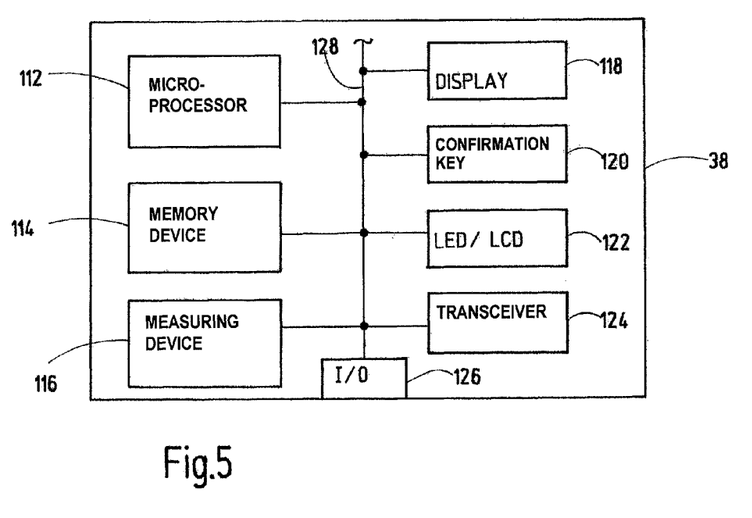
FIG. 5 shows a block diagram of a display device.

With reference to FIG. 5, a structure of a display device 38 will be described in more detail.

The display device 38 preferably comprises a microprocessor 112, a memory device 114, a measuring device 116, a display 118, a confirmation key 120, a lamp 122, a transceiver unit 124, and/or at least one interface 126, which can be connected to each other via an internal communication bus 80.

The microprocessor 112 is substantially responsible for processing data which are transmitted by the controls 100 and/or 102 in an addressed manner. The memory device 114 is used, for example, for recording the (unique) address 88 of the display device 38 (MAC address, serial number, communication address allocated by the superordinated control 102, etc.). EPROMs and/or DRAMs can be used as memory devices 104. Further, inventory data (number of presently stored storage goods), dimension of the storage space having the mounted display device 38, or similar information can be recorded in the memory device 114.

Each of the display devices 38 can comprise a separate measuring device 116 such as a current or voltage measuring instrument, an optical reading head, or similar.

A removal quantity can be visually displayed in terms of figures. For this purpose by means of the display 118, for example, LCDs or LEDs can be used.

A warehouse worker can signal to the display device 38, after a conducted storage good removal, by means of the confirmation key 120 that the removal process is completed. Then, the display device 38 can process this information by means of the microprocessor 112, and send same in terms of a signal via the interface 126 into the network 104 to the control 100 or 102.

The lamp 122 is used for visualizing to the warehouse worker from which of the storage spaces 22 storage good is to be retrieved or to which of the storage spaces 22 storage good is to be put. The lamp 122 can be implemented in terms of LEDs, LCDs, or the like. The lamps 122 are lid, for example, green, red, or orange in an activated state for visually signalling the storage space 22 to the warehouse worker.

For example, identification markers, which the warehouse worker wears, can be read by means of the transceiver unit 124, which can be operated with infrared ultrasonic or any other electromagnetic waves. The warehouse worker can wear an RFIDmarker at his/her wrist interacting with the transceiver unit 124, if the warehouse worker removes or deposits a storage good within the close range of the display device 138. It is clear that the radius of action of the transceiver unit 124 is limited such that no false recognitions occur by adjacent display devices 38 in case of removal or deposition of a storage good.

One of the strengths of this storage and order-picking system 10 of the present invention is to be seen in that the display devices 38 can be mounted to an arbitrary one of the storage spaces 22 by any warehouse workers. After the mounting of the display device 38, of course, an allocation of a unique communication address to each corresponding storage space 22 can be conducted. The arrangement and the structure of the warehouse 12 are recorded for this purpose, in terms of data, preferably in accordance with the spatial coordinates of the reference system "warehouse 12". The arrangement and the structure (i.e. the layout) of the warehouse 12 can easily be represented in a graphical user interface (GUI), for example, on the screen 34. The warehouse worker can arbitrarily allocate the display device 38 to the storage spaces 22, or he/she gets the mounting location indicated graphically on the screen 34.

Further, it is possible to initially equip all of the storage spaces 22 with display devices 38, or to retrofit only such storage spaces 22 which are actually occupied by storage good or which at least get actually assigned storage goods.

As soon as the display devices 38 are mounted to the storage spaces 22, a respective mounting location of the display devices 38 can be determined by means of the location-measuring system 108. For this purpose, the display device 38 can determine, for example, the resistance value 90 measured via the electrical line 110. Then, the measured value 90 is transmitted over the communication bus 56 together with the unique address 88 to the control 100 or 102. The control 100 or 102 then determines, by comparing the measured value 90 to the recorded mounting location (cf. FIG. 6), the spatial coordinates of the possible storage-space location 86, and thus which storage space number 84 matches the respectively mounted display device 38. For this purpose, the control device 100, or 102, comprises a memory device 101 where a storage-space location 86 is recorded for each of the storage spaces 22.

Figure 6:
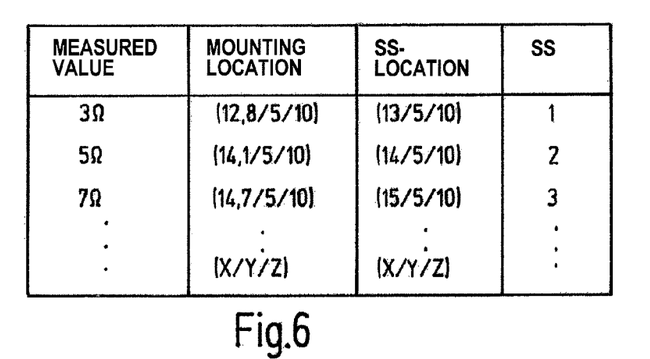
FIG. 6 shows another table, which shows an allocation between the measured values of the location-measuring system and (spatial) coordinates of a preferred reference system.

With reference to FIG. 6, the measured values 90 (cf. FIG. 3), which can be determined by means of the location-measuring system 108 for each display device 38, are represented against (location or spatial) coordinates in the reference system of the storage spaces 22. This allocation can be determined, for example, by calculation, i.e. in case of the above described resistance measurement a function is determined by which each of the measured resistances can be assigned, for example, to a distance relative to a reference point. This dependence between measured values 90 and location coordinates is determined and recorded in advance. It goes without saying that the coordinates can also be determined directly, if, for example, a locating system, which is integrated into the warehouse, is used, as described above (receivers at facility ceiling).

Alternatively, the mounting locations of the display devices 38 can be determined through run times of the signals between the corresponding display device 38 and the control device 100, or 102. However, this requires the display devices 38 being connected to each other in a sequence.

Figure 7:
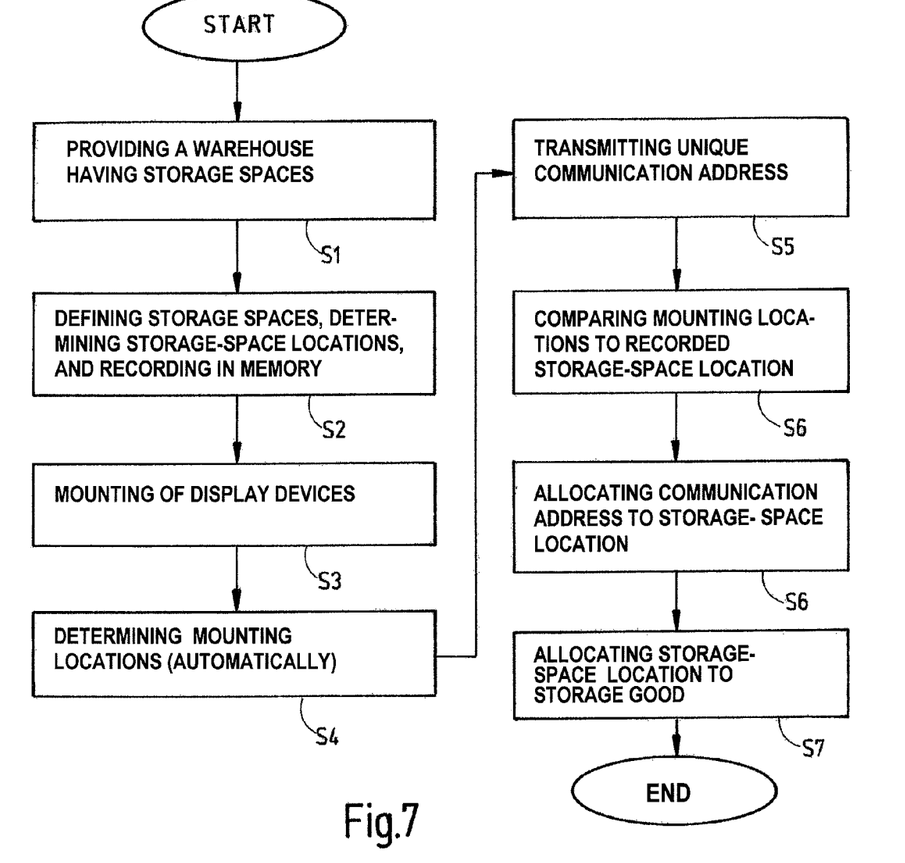
FIG. 7 shows a flow chart of the method in accordance with the invention.

With reference to FIG. 7, a method of configuring a storage and order-picking system 10 is shown, which is suitable for manual light-guided order processing. The method comprises the following steps. In step S1 a warehouse 12 is provided with a plurality of storage spaces 22 which can be defined freely. In step S2 the storage spaces 22 are defined with regard to dimension, a corresponding storage-space location is determined, preferably in a spatial coordinate system of the warehouse 12, and recorded in a memory device 101. In step S3 the display devices 38 are mounted at least to the defined storage spaces 22. In step S4 each mounting location is automatically determined, namely by means of the location-measuring system 108. In step S5 a communication address 88 of each mounted display device 38 is transmitted, together with the mounting location or an equivalent value 90, to the control device 100 or 102 through the network 104. In step S6 each of the transmitted mounting locations is compared to the recorded storage-space locations for determining to which storage space 22 the corresponding display device 38 has been mounted. Then, the address 88 of the display device 38 can be allocated to this storage space 22 as unique communication address.

It is clear that the invention can also be applied to a group of storage spaces 22, wherein the group is centrally addressed by means of one communication address. In this case, the display device 38 can additionally indicate a specific storage space 22 of the storage space group, for example, by indicating, beside the removal quantity, also a storage space number (e.g., "4711"), wherein each of the storage spaces of the storage space group is correspondingly specified. The storage space "4711" can comprise, for example, a correspondingly labeled sign. Alternatively, arrows can be used for indicating the direction to the warehouse worker, where he/she finds the specific storage space 22 of a storage space group. In this case, it is recorded in the memory device, where the display device 38 is arranged within the storage space group. A storage space group comprising nine storage spaces 22, for example, being arranged in a 3×3 matrix, can be equipped with one display device 38, which sits centrally in the 3×3 matrix and is operated by means of arrows for specifying individual ones of the storage spaces 22 of the storage space group. In addition to the storage-space locations it is recorded in this memory device 110 to which storage space group a corresponding storage space 22 belongs. Additionally, it can be recorded where the (central) display device 38 within the storage space group is located. The mounting location of the (central) display device can be preset by the warehouse worker, or by the control.

Therefore, what I claim is:

1. A storage and order-picking system configured for automatically assigning communication addresses to storage spaces and further configured for manual light-guided order-processing by an order-picking person, comprising:
    at least one warehouse having a plurality of storage spaces, wherein each of the storage spaces is either a free storage space or an assigned storage space to which a storage good is assigned;
    a plurality of display devices, wherein the display devices are allocated at least to the assigned storage spaces thereby defining allocated and assigned storage spaces as well as allocated display devices, wherein each of the allocated display devices is mounted to the corresponding one of the allocated and assigned storage spaces, and wherein each of the display devices comprises one measuring device, which is adapted for generating a measured value, has a unique communication address;
    a control device which is data-connected to the allocated display devices and which is configured to transmit order-picking data to each of the allocated display devices, wherein each of the allocated display devices is adapted to be activated, based on transmitted order-picking data, such that the order-picking person visually recognizes from which ones of the allocated and assigned storage spaces storage goods are to be removed, and wherein the control device comprises a memory device where a storage-space location is respectively recorded, in terms of coordinates, for each of the storage spaces;
    a network, which data-connects the allocated display devices to the control device; and
    a location-measuring system which is configured to determine, based on the measured values, a mounting location for each mounted display device, and to compare the so-determined mounting location with the recorded storage-space locations, wherein each of the mounting locations is uniquely allocatable to one of the recorded storage-space locations, in order to allocate one of the recorded storage-space locations, which matches to the so-determined mounting location, and one of the unique communication addresses to the so-determined mounting location.

2. The storage and order-picking system of claim 1, wherein the location-measuring system comprises the measuring devices and the control device, which is configured to allocate the so-determined mounting location.

3. The storage and order-picking system of claim 1, wherein the storage-space locations and the so-determined mounting location are presented in spatial coordinates of the warehouse.

4. The storage and order-picking system of claim 3, wherein the storage locations are arranged along a predefined grid in the warehouse.

5. The storage and order-picking system of claim 1, wherein the location-measuring system further comprises at least one electrical line, wherein the at least one electrical line is provided at each of the storage spaces such that each of the allocated display devices is connectable to the at least one electrical line so that an individualizing distance-dependent ohmic resistance value is measurable for generating the measured value.

6. The storage and order-picking system of claim 5, wherein a fixed default voltage is applied to the electrical line.

7. The storage and order-picking system of claim 1, wherein the location-measuring system further comprises at least one optically readable continuous distance measure, which is provided at each of the storage spaces such that each of the allocated display devices is arranged adjacent to the distance measure allowing the measuring device to read the respective mounting location from the distance measure.

8. The storage and order-picking system of claim 1, wherein the location-measuring system comprises a locating system which is capable of determining each of the mounting locations.

9. The storage and order-picking system of claim 1, wherein the location-measuring system comprises a device for detecting a run time of a signal transmission between the corresponding one of the allocated display devices and the control device, wherein an individualizing signal run time is recorded in the memory device for each of the storage-space locations.

10. The storage and order-picking system of claim 1, wherein the measured value is equivalent to one of a spatial coordinate and a region in space.

11. The storage and order-picking system of claim 1, further comprising a plurality of measuring sensors, wherein each of the display devices has respectively integrated one of the measuring sensors.

12. In a storage and order-picking system, which is configured for manual light-guided order-processing by an order-picking person and which comprises a warehouse including a plurality of storage spaces, a plurality of display devices, a control device having a memory device, a network, and a location-measuring device, wherein the storage spaces are definable freely, wherein respectively one display device is mounted to each of the so-defined storage spaces, each of the display devices has a unique communication address and being capable of generating a measured value, and wherein for each of the so-defined storage spaces one storage-space location is recorded in the memory device in terms of coordinates, a method for automatically assigning communication addresses to the storage spaces, the method comprising the steps of:

- defining the storage spaces,
- determining one storage-space location for each of the so-defined storage spaces and recording each of the so-determined storage-space locations in the memory device;
- mounting the display devices to the so-defined storage spaces;
- automatically determining one mounting location for each of the mounted display devices by means of the location-measuring system based on the measured values generated by the mounted display devices;
- respectively transmitting a unique communication address between each of the mounted display device and the control device via the network, which data-connects the mounted display devices to the control device; and
- comparing the mounting locations to the recorded storage-space locations for respectively allocating one of the unique communication addresses to each of the defined storage spaces.

13. The method of claim 12, wherein each of the so-defined storage spaces is one of a unit-storage space and a group of directly adjacent unit-storage spaces.

14. The method of claim 12, wherein the display devices are only mounted to such so-defined storage spaces which actually have, or will be, assigned storage goods.

15. The method of claim 12, wherein the storage spaces are defined in a storage-good-optimized manner.

* * * * *